(12) United States Patent
Iijima

(10) Patent No.: US 7,833,675 B2
(45) Date of Patent: Nov. 16, 2010

(54) PROTON CONDUCTOR, AND FUEL CELL AND FUEL CELL SYSTEM INCLUDING PROTON CONDUCTOR

(75) Inventor: Masahiko Iijima, Fujimino (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 101 days.

(21) Appl. No.: 12/388,751

(22) Filed: Feb. 19, 2009

(65) Prior Publication Data
US 2009/0220846 A1    Sep. 3, 2009

(30) Foreign Application Priority Data
Feb. 29, 2008  (JP) .............................. 2008-051368

(51) Int. Cl.
*H01M 8/10* (2006.01)

(52) U.S. Cl. ........................... 429/481; 429/495

(58) Field of Classification Search ........................ None
See application file for complete search history.

(56) References Cited

U.S. PATENT DOCUMENTS

2007/0128491 A1*  6/2007  Chisholm et al. ............. 429/33

FOREIGN PATENT DOCUMENTS

| JP | 2001338657 A | 12/2001 |
|---|---|---|
| JP | 2003080085 | 3/2003 |
| JP | 2004515896 T | 5/2004 |
| JP | 2005005088 | 1/2005 |
| JP | 2005276721 | 10/2005 |
| JP | 2005310606 A | 11/2005 |
| JP | 2006164642 A | 6/2006 |
| JP | 2006294628 | 10/2006 |
| JP | 2008016457 A | 1/2008 |
| JP | 2008027873 A | 2/2008 |
| JP | 2008513959 T | 5/2008 |

* cited by examiner

*Primary Examiner*—John S Maples
(74) *Attorney, Agent, or Firm*—Gifford, Krass, Sprinkle, Anderson & Citkowski, P.C.

(57) ABSTRACT

A proton conductor includes a water-soluble electrolyte membrane with proton conductivity and a proton-conductive ceramic that is provided on at least one surface of the water-soluble electrolyte membrane.

6 Claims, 4 Drawing Sheets

PROTON CONDUCTOR, AND FUEL CELL AND FUEL CELL SYSTEM INCLUDING PROTON CONDUCTOR

INCORPORATION BY REFERENCE

The disclosure of Japanese Patent Application No. 2008-051368 filed on Feb. 29, 2008 including the specification, drawings and abstract is incorporated herein by reference in its entirety.

BACKGROUND OF THE INVENTION

1. Field of the Invention

The invention relates to a proton conductor, and a fuel cell and a fuel cell system that include the proton conductor.

2. Description of the Related Art

A fuel cell is a device that produces electric energy typically using hydrogen and oxygen as fuel. The fuel cell is advantageous in terms of environmental protection and achieves high energy efficiency. Therefore, the fuel cell is widely developed as a future energy supply system.

A proton conductor is developed as an electrolyte membrane used in the fuel cell. For example, Japanese Patent Application Publication No. 2005-276721 (JP-A-2005-276721) describes the technology in which a solid acid is used as the proton conductor.

However, some types of solid acids are water-soluble. In this case, the electrolyte may be dissolved by water produced by a power generation reaction that takes place in the fuel cell.

SUMMARY OF THE INVENTION

The invention provides a proton conductor that is less soluble in water, and a fuel cell and a fuel cell system that include the proton conductor.

A proton conductor according to a first aspect of the invention includes a water-soluble electrolyte membrane with proton conductivity and a proton-conductive ceramic that is provided on at least one surface of the water-soluble electrolyte membrane. In the proton conductor according to the first aspect, contact between water produced and the water-soluble electrolyte membrane is reduced by the proton-conductive ceramic. This suppresses dissolution of the water-soluble electrolyte membrane. Further, because the proton-conductive ceramic has proton conductivity, the proton conductivity of the proton conductor according to the first aspect is ensured.

The water-soluble electrolyte membrane may be made of a solid hydrogen acid or a polyphosphoric acid, and the solid hydrogen acid may be $CsHSO_4$ or $CsH_2PO_4$. In this case, the proton conductivity is high. Further, the proton-conductive ceramic may be made of a perovskite electrolyte, and the perovskite electrolyte may be $SrZr_{(1-x)}In_xO_3$.

A fuel cell according to a second aspect of the invention includes: a proton conductor that includes a water-soluble electrolyte membrane with proton conductivity and a proton-conductive ceramic that is provided on at least one surface of the water-soluble electrolyte membrane; a cathode provided on the proton-conductive ceramic provided on one of the at least one surface of the water-soluble electrolyte membrane; and an anode provided on a surface of the proton conductor that is opposite to a surface of the proton conductor on which the cathode is provided. In this case, the contact between the electrolyte membrane and water produced in the cathode during power generation is reduced by the proton-conductive ceramic.

The anode may be made of a hydrogen-permeable metal. In this case, the contact between the electrolyte membrane and water is reduced even if fuel gas contains water. Further, the hydrogen-permeable metal may be palladium.

A fuel cell system according to a third aspect of the invention includes a fuel cell and a scavenging portion. The fuel cell includes: a proton conductor that includes a water-soluble electrolyte membrane with proton conductivity and a proton-conductive ceramic that is provided on at least one surface of the water-soluble electrolyte membrane; a cathode provided on the proton-conductive ceramic provided on one of the at least one surface of the water-soluble electrolyte membrane; and an anode provided on a surface of the proton conductor that is opposite to a surface of the proton conductor on which the cathode is provided. The scavenging portion supplies scavenging gas to the cathode when power generation of the fuel cell is stopped. In the fuel cell system according to the third aspect, water remaining in the cathode is removed. This further reduces the contact between water and the electrolyte membrane.

According to the aforementioned aspects of the invention, it is possible to suppress dissolution of the proton conductor into water.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First embodiment

Figure 1:
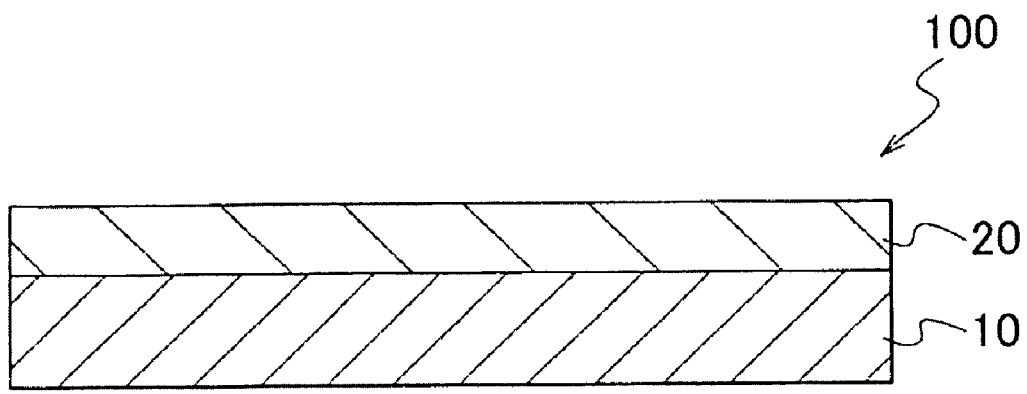
FIG. 1 is a cross-sectional view schematically showing a proton conductor according to a first embodiment of the invention.

FIG. 1 is a cross-sectional view schematically showing a proton conductor 100 according to a first embodiment of the invention. As shown in FIG. 1, the proton conductor 100 is configured so that a proton-conductive ceramic 20 is provided on one surface of an electrolyte membrane 10. The electrolyte membrane 10 is made of a water-soluble electrolyte with proton conductivity.

The electrolyte membrane 10 is made of, for example, a solid hydrogen acid and a polyphosphoric acid. Examples of the solid hydrogen acid used to form the electrolyte membrane 10 are $CsHSO_4$, $CsH_2PO_4$, $Cs_2(HSO_4)(H_2PO_4)$, $MH_2PO_4$, $MHAO_4$, $M_3H(AO_4)_2$, $M_4H_2(AO_4)_3$, and $M_5H_3(AO_4)_4$. Note that K or Rb is assigned to M in the chemical formulae, and S or Se is assigned to A. Further, an example of the polyphosphoric acid is $NH_4PO_3$.

The proton conductive ceramic 20 is made of ceramic that is proton-conductive and impervious to water. An example of the proton-conductive ceramic 20 is a perovskite electrolyte. Examples of the perovskite electrolyte are $SrZr_{(1-x)}In_xO_3$, $BaZr_{(1-x)}Y_xO_3$, $BaZr_{(1-x)}In_xO_3$, $SrZr_{(1-x)}Y_xO_3$, $SrZr_{(1-x)}Yb_xO_3$, $SrCe_{(1-x)}Y_xO_3$, $SrCe_{(1-x)}Yb_xO_3$, $SrCe_{(1-x)}In_xO_3$, $BaZr_{(1-x)}Yb_xO_3$, $BaCe_{(1-x)}Y_xO_3$, $BaCe_{(1-x)}Yb_xO_3$, and $BaCe_{(1-x)}In_xO_3$. For example, the proton-conductive ceramic 20 is formed by pulsed laser deposition (PLD).

According to the first embodiment, the proton-conductive ceramic 20 is provided on the electrolyte membrane 10, and therefore, it is possible to reduce the contact between water and the surface of the electrolyte membrane 10 on which the proton-conductive ceramic 20 is provided, whereby dissolution of the electrolyte membrane 10 is suppressed. Further, because the proton-conductive ceramic 20 has proton conductivity, it is possible to suppress degradation of proton conductivity of the proton conductor 100.

Second embodiment

Figure 2:
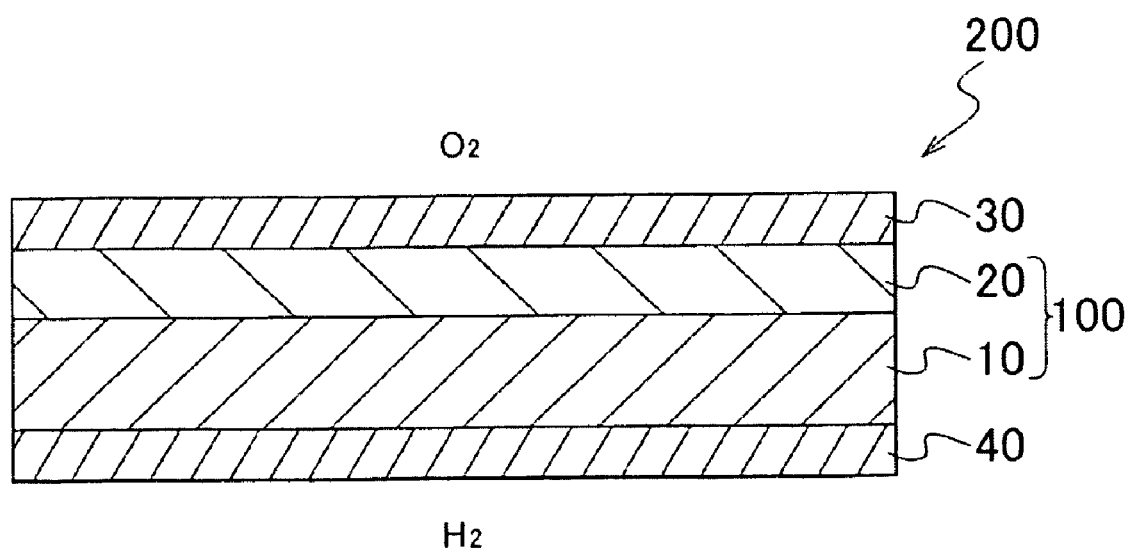
FIG. 2 is a cross-sectional view schematically showing a fuel cell according to a second embodiment of the invention.

FIG. 2 is a cross-sectional view schematically showing a fuel cell 200 according to a second embodiment of the invention. As shown in FIG. 2, in the fuel cell 200, a cathode electrode 30 is provided on the proton-conductive ceramic 20 in the proton conductor 100 as shown in FIG. 1, and an anode electrode 40 is provided on a surface of the proton conductor 100 that is opposite to the surface of the proton conductor 100 on which the cathode electrode 30 is provided. The cathode electrode 30 and the anode electrode 40 are made of a material that is catalytically active and electrically conductive. For example, the cathode electrode 30 and the anode electrode 40 are porous electrodes made of a noble metal, such as platinum.

Next, the operation of the fuel cell 200 will be described. First, fuel gas containing hydrogen is supplied to the anode electrode 40. The hydrogen contained in the fuel gas is dissociated into protons and electrons at an interface between the anode electrode 40 and the electrolyte membrane 10. The protons reach the cathode electrode 30 through the proton conductor 100. On the other hand, oxidizing gas that contains oxygen is supplied to the cathode electrode 30. The oxygen contained in the oxidizing gas reacts with the protons and electrons in the cathode electrode 30. The fuel cell 200 generates power through the operation as described above. It should be noted that the operating temperature of the fuel cell 200 is approximately 200° C.

Water is produced during power generation as described above. In the second embodiment, because the proton-conductive ceramic 20 is provided between the cathode electrode 30 and the electrolyte membrane 10, the contact between the electrolyte membrane 10 and water thus produced is reduced, whereby dissolution of the electrolyte membrane 10 is suppressed.

Figure 3A:
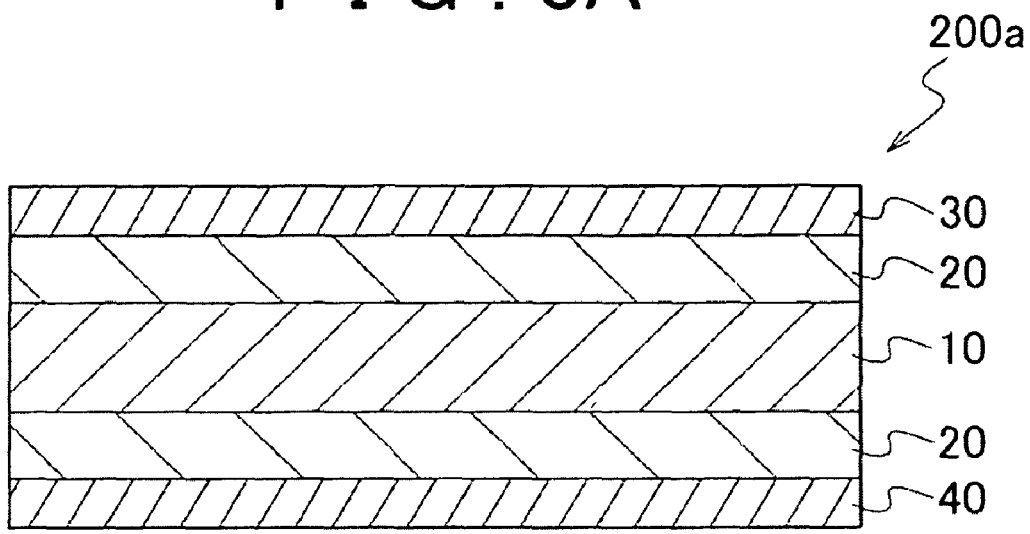
FIGS. 3A, 3B, and 3C show other examples of the fuel cell and an electrolyte membrane.

FIG. 3A is a cross-sectional view schematically showing a fuel cell 200a, which is another example of the fuel cell 200. As shown in FIG. 3A, in the fuel cell 200a, the proton-conductive ceramic 20 is provided between the anode electrode 40 and the electrolyte membrane 10, in addition to the proton-conductive ceramic 20 between the cathode electrode 30 and the electrolyte membrane 10. The fuel gas contains water if the fuel gas is produced using, for example, a reformer. In this case, if the fuel cell 200a is employed, even when the fuel gas contains water, it is possible to reduce the contact between water contained in the fuel gas and the electrolyte membrane 10. As a result, it is possible to suppress dissolution of the electrolyte membrane 10.

Figure 3B:
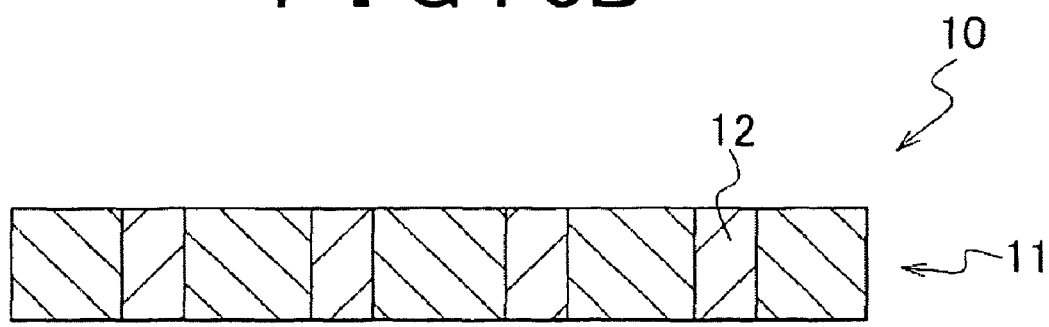
Figure 3C:
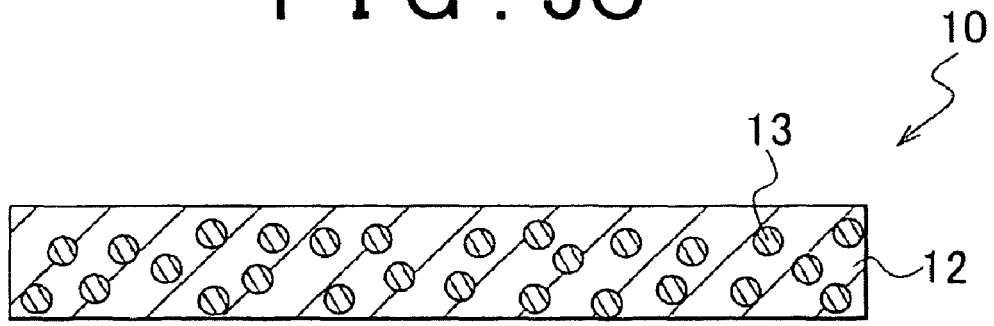

If the electrolyte that forms the electrolyte membrane 10 does not have sufficient strength, the electrolyte membrane 10 may be reinforced by, for example, a ceramic. For example, as shown in FIG. 3B, the electrolyte membrane 10 may be a porous ceramic substrate 11 whose pores are filled with an electrolyte 12 that constitutes the electrolyte membrane 10. Further, as shown in FIG. 3C, the electrolyte membrane 10 may be formed by mixing ceramic particles 13 into the electrolyte 12.

Third embodiment

Figure 4:
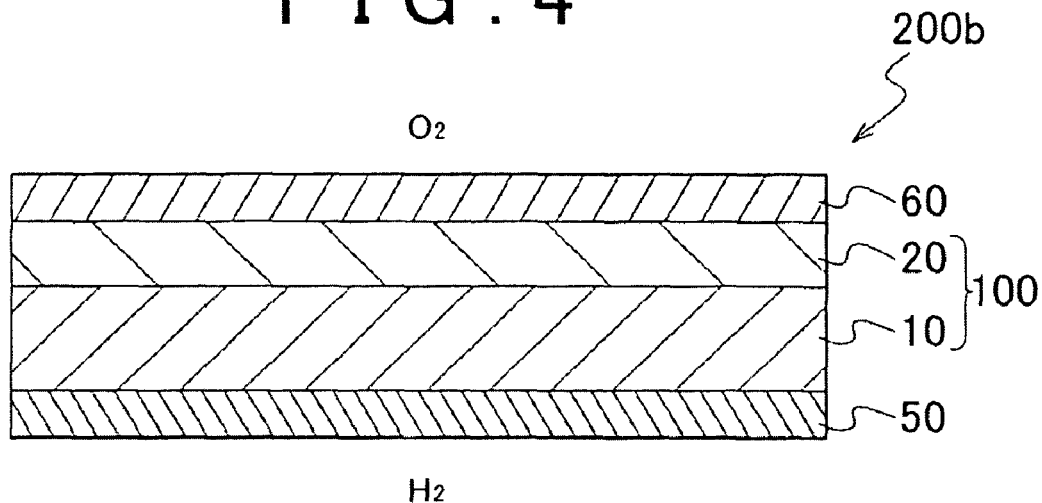
FIG. 4 is a cross-sectional view schematically showing a fuel cell according to a third embodiment of the invention.

Next, a fuel cell 200b according to a third embodiment of the invention will be described. FIG. 4 is a cross-sectional view schematically showing the fuel cell 200b. As shown in FIG. 4, the fuel cell 200b is configured so that the proton conductor 100 and the cathode electrode 60 are stacked on a hydrogen separation membrane 50. In the third embodiment, the proton-conductive ceramic 20 is disposed between the cathode electrode 60 and the electrolyte membrane 10 of the proton conductor 100.

The hydrogen separation membrane 50 functions as a support body that supports and reinforces the proton conductor 100, and further, the hydrogen separation membrane 50 functions as an anode. The hydrogen separation membrane 50 is made of a dense hydrogen-permeable metal. The hydrogen separation membrane 50 according to the third embodiment is configured to be dense to the extent that hydrogen in the form of a proton and/or in the form of a hydrogen atom passes through the hydrogen separation membrane 50. The material of the hydrogen separation membrane 50 is not limited to a specific material, as long as the material is dense, hydrogen-permeable, and electrically conductive. The example materials of the hydrogen separation membrane 50 include metals, such as Pd (palladium), V (vanadium), Ta (tantalum), and Nb (niobium), and alloys of these metals. The thickness of the hydrogen separation membrane 50 is not limited to a specific thickness, and ranges from approximately 5 μm to 100 μm, for example. The hydrogen separation membrane 50 may be a self-supported membrane, or may be a thin membrane supported by a porous poor metal plate.

The cathode electrode 60 is made of an electrode material that is catalytically active and electrically conductive. The cathode electrode 60 is, for example, made of oxygen ion-conductive ceramic (such as $La_{0.6}Sr_{0.4}CoO_3$, $La_{0.5}Sr_{0.5}MnO_3$, and $La_{0.5}Sr_{0.5}FeO_3$).

Next, the operation of the fuel cell 200b will be described. First, fuel gas containing hydrogen is supplied to the hydrogen separation membrane 50. The hydrogen contained in the fuel gas passes through the hydrogen separation membrane 50 in the form of a proton and/or in the form of a hydrogen atom. The hydrogen atoms that reach the electrolyte membrane 10 are dissociated into the protons and the electrons at the interface between the hydrogen separation membrane 50 and the electrolyte membrane 10. The protons reach the cathode electrode 60 through the proton conductor 100. On the other hand, the oxidizing gas containing oxygen is supplied to the cathode electrode 60. The oxygen contained in the oxidizing gas reacts with the protons and the electrons in the cathode electrode 60. In this way, the fuel cell 200b generates power.

Water is produced during power generation as described above. In the third embodiment, because the proton-conductive ceramic 20 is disposed between the cathode electrode 60 and the electrolyte membrane 10, the contact between the electrolyte membrane 10 and water thus produced is reduced. This makes it possible to suppress dissolution of the electrolyte membrane 10. Further, because the hydrogen separation membrane 50 is made of a dense metal, the contact between the electrolyte membrane 10 and water is reduced even if the fuel gas contains water.

Figure 5:
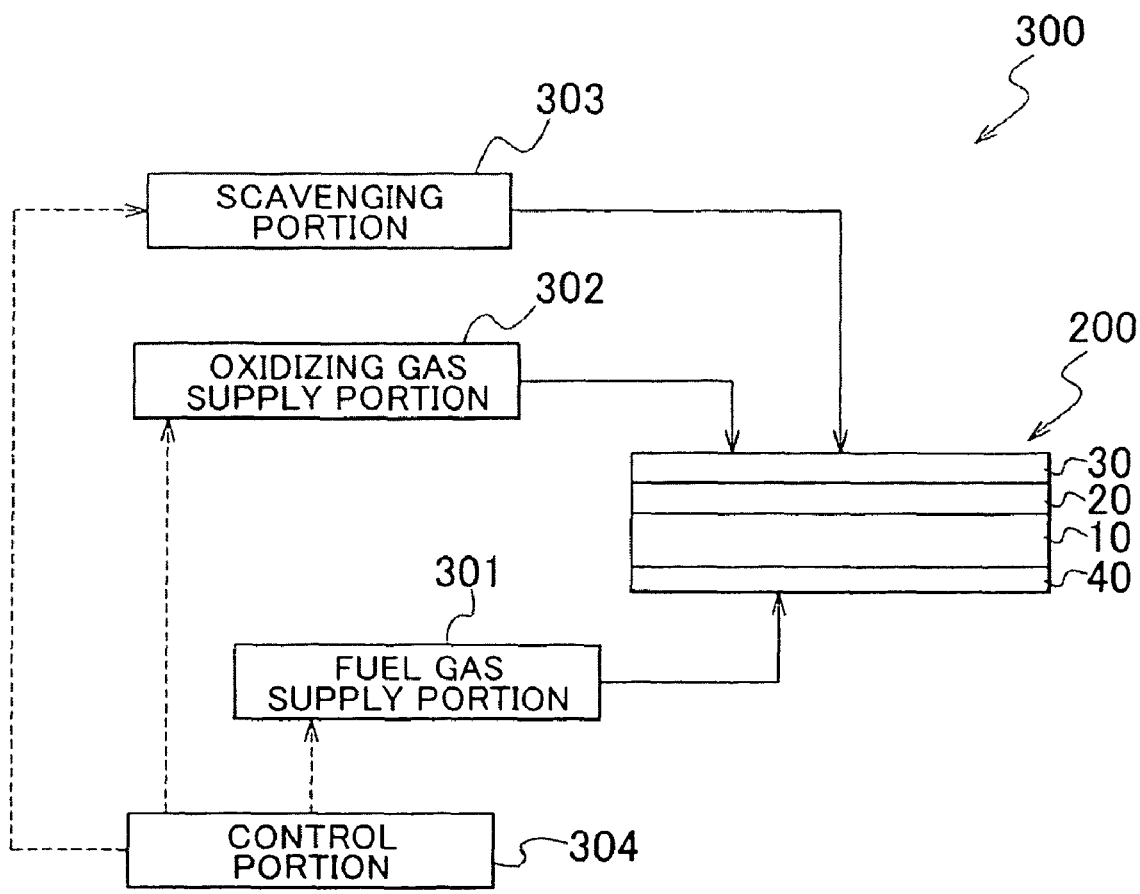
FIG. 5 is a schematic view showing an entire configuration of a fuel cell system according to a fourth embodiment of the invention.

(Fourth embodiment) Next, a fuel cell system 300 according to a fourth embodiment of the invention will be described. FIG. 5 is a schematic view showing the entire configuration of the fuel cell system 300. As shown in FIG. 5, the fuel cell system 300 includes the fuel cell 200 shown in FIG. 2, a fuel gas supply portion 301, an oxidizing gas supply portion 302, a scavenging portion 303, and a control portion 304.

The fuel cell supply portion 301 supplies fuel gas to the anode electrode 40 in accordance with a command sent from the control portion 304, and includes a hydrogen cylinder, a reformer, etc. The oxidizing gas supply portion 302 supplies the oxidizing gas to the cathode electrode 30 in accordance with a command sent from the control portion 304, and includes an air pump, etc. The scavenging portion 303 supplies scavenging gas to the cathode electrode 30 in accordance with a command sent from the control portion 304, and includes an inert gas cylinder, an air pump, etc. In the fourth embodiment, the oxidizing gas supply portion 302 is provided separately from the scavenging portion 303. However, the oxidizing gas supply portion 302 may be used as the scavenging portion 303. The control portion 304 includes, for example, a central processing unit (CPU), a read-only memory (ROM), and a random access memory (RAM).

Next, the operation of the fuel cell system 300 will be described. The control portion 304 controls the fuel gas supply portion 301 so that fuel gas is supplied to the anode electrode 40. Further, the control portion 304 controls the oxidizing gas supply portion 302 so that the oxidizing gas is supplied to the cathode electrode 30. In this configuration, an electric circuit (not shown) that includes the cathode electrode 30 and the cathode electrode 40 of the fuel cell 200 is formed, and power is generated in the fuel cell 200.

Figure 6:
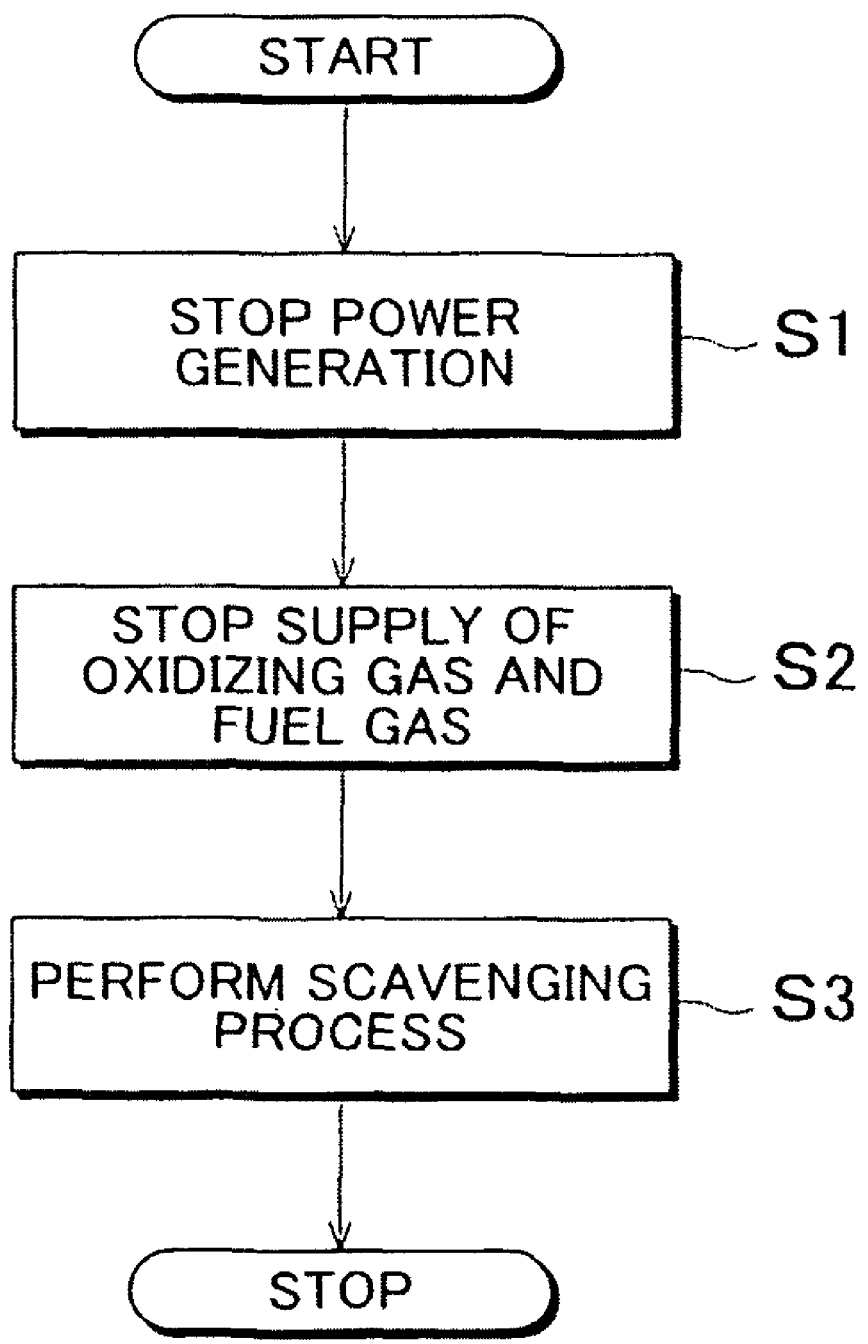
FIG. 6 shows an example of a flowchart when power generation of the fuel cell is stopped.

Next, control executed when power generation of the fuel cell 200 is stopped will be described with reference to a flowchart shown in FIG. 6. As shown in FIG. 6, the control portion 304 executes control to interrupt the aforementioned electric circuit (in S1), and thus, power generation of the fuel cell 200 is stopped. Next, the control portion 304 controls the fuel gas supply portion 301 to stop supply of the fuel gas, and also controls the oxidizing gas supply portion 302 to stop supply of the oxidizing gas (in step S2). Then, the control portion 304 controls the scavenging portion 303 to supply scavenging gas to the cathode electrode 30 (in step S3). Then, the control portion 304 ends execution of the flowchart.

This flowchart makes it possible to remove water remaining in the cathode electrode 30. In this configuration, it is possible to further reduce the contact between the electrolyte membrane 10 and water thus produced. Accordingly, it is possible to reduce degradation of the power generation performance of the fuel cell 200.

The fuel cell 200a shown in FIG. 3A may be used in place of the fuel cell 200. In this case, the scavenging portion 303 supplies scavenging gas to both of the cathode electrode 30 and the anode electrode 40. In this configuration, it is possible to remove water remaining in the cathode electrode 30 and the anode electrode 40. Further, the fuel cell 200b shown in FIG. 4 may be used in place of the fuel cell 200. In this case, the scavenging portion 303 supplies scavenging gas to the cathode electrode 60.

In an example below, the proton conductors according to the embodiments as described above were produced in order to study characteristics of the proton conductors.

EXAMPLE

In the example, a palladium substrate was coated with CsHSO$_4$ powder by thermal spraying to produce a CsHSO$_4$ membrane in the thickness of approximately 100 μm. A coating of SrZr$_{0.8}$In$_{0.2}$O$_3$ in the thickness of approximately 1 μm was formed on the surface of the C$_s$HSO$_4$ membrane by PLD. In this way, the proton conductor that weighed 0.1 g was formed.

Comparative Example

In a comparative example, the CsHSO$_4$ membrane that weighed 0.1 g was used as the proton conductor.

(Analysis) The proton conductors according to the example and the comparative example were immersed into water, and the amount of each proton conductor dissolved into water was measured based on a change in weight of the proton conductor in water after an hour. The result of measurement is shown in a table 1 below. As shown in the table 1, the amount of change in the weight of the proton conductor according to the example was 0.0003 g. On the other hand, the proton conductor according to the comparative example did not remain after filtration, and thus, the amount of change in the weight of the proton conductor according to the comparative example was 0.1000 g. This indicates that, dissolution of the proton conductor in the example was suppressed, while the proton conductor in the comparative example was dissolved into water. Accordingly, it is experimentally proved that dissolution of the water-soluble electrolyte into water is suppressed by forming the proton-conductive ceramic on the surface of the water-soluble electrolyte.

TABLE 1

|  | Weight of sample | Amount of Change in weight |
| --- | --- | --- |
| Example | 0.1 g | 0.0003 g |
| Comparative example | 0.1 g | 0.1000 g |

What is claimed is:

1. A fuel cell comprising:
   a proton conductor that includes an electrolyte membrane made of a solid hydrogen acid or a polyphosphoric acid, and a proton-conductive ceramic that is provided on at least one surface of the electrolyte membrane;
   a cathode provided on the proton-conductive ceramic; and
   an anode which is made of a hydrogen-permeable metal, and which is provided on a surface of the proton conductor that is opposite to a surface of the proton conductor on which the cathode is provided.

2. The fuel cell according to claim 1, wherein the solid hydrogen acid is CsHSO$_4$ or CsH$_2$PO$_4$.

3. The fuel cell according to claim 1, wherein the proton-conductive ceramic is made of a perovskite electrolyte.

4. The fuel cell according to claim 3, wherein the perovskite electrolyte is SrZr$_{(1-x)}$In$_x$O$_3$.

5. The fuel cell according to claim 1, wherein the hydrogen-permeable metal is palladium.

6. A fuel cell system comprising:
   the fuel cell according to claim 1; and
   a scavenging portion that supplies scavenging gas to the cathode when power generation of the fuel cell is stopped.

* * * * *